Figure 1:
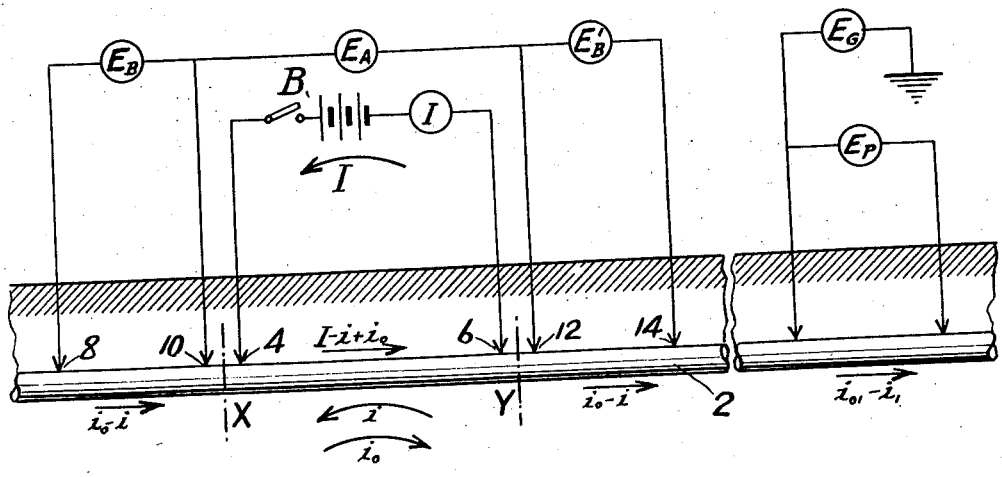

July 13, 1937.                J. M. PEARSON                2,086,737
                   ELECTRICAL MEASURING METHOD AND MEANS
                           Filed July 29, 1936

WITNESS:

INVENTOR
John M. Pearson
BY
ATTORNEYS.

Patented July 13, 1937

2,086,737

UNITED STATES PATENT OFFICE 2,086,737

ELECTRICAL MEASURING METHOD AND MEANS

John M. Pearson, Swarthmore, Pa., assignor to Sun Oil Company, Philadelphia, Pa., a corporation of New Jersey Application July 29, 1936, Serial No. 93,141

3 Claims. (Cl. 175—183)

This invention relates to a method and means for ascertaining the effect of insulating a portion of a grounded conductor such as, for example, a pipe line, without actually cutting and insulating the portion of the conductor.

In order to avoid destructive electrolysis of elongated conductors buried in or making extended contact with the ground, for example, pipe lines or sheathed cables or the like, it has been customary to change the configuration of the electrical system which is involved by insulating such conductors which are being affected or which may affect others by breaking the metallic continuity and by covering extended lengths adjacent the break with a non-conductor such as, for example, pitch or the like. This method of protection is frequently quite effective. The configurations involved, however, are generally very complicated and guesses as to the effect of insulating a certain portion of a conductor are quite likely to be considerably in error.

Heretofore the method which was adopted was to attempt to analyze the entire configuration and deduce where an insulated section would be effective to correct corrosive conditions. The test of the accuracy of the deductions, however, was to actually insulate the conductor. If the deductions were then shown to be in error, reconsideration of the whole system had to be made and a new attempt at insulation in another place made. Quite frequently it was found that insulation at a point where it would seem to be effective increased rather than decreased corrosion or, alternatively, protected a part previously being corroded and produced corrosive conditions somewhere else.

The principal objection to the method of trial and error is the cost. Not only does the insulating procedure take the pipe line out of operation for some time, but it is a quite costly one. A comparatively insurmountable obstacle, however, occurs where corrosion of a structure belonging to one party would seem to indicate the necessity for insulating the structure of another party. Obviously the second party is not likely to consent to tampering with its structure unless greater certainty of satisfactory results would appear than is indicated by the methods of deduction heretofore used.

It is the object of the present invention to determine precisely what the effect of insulating a section of a conductor will be without actually insulating the section and, in fact, without even uncovering the section if buried. Specifically this object is accomplished by setting up an electrical system which is capable of producing the electrical conditions which would exist if a portion of the conductor were insulated, though in practice these conditions are not actually attained but rather deduced from the effects of an arrangement more easily manipulated than one which would actually achieve the equivalent results. Briefly stated, there would be no current flowing into or out of an insulated section of a conductor, and by providing an electrical arrangement producing a condition of no flow of current where the ends of the insulated section are to be, an electrical configuration equivalent to that obtained with an insulating section is obtained.

Figure 2:
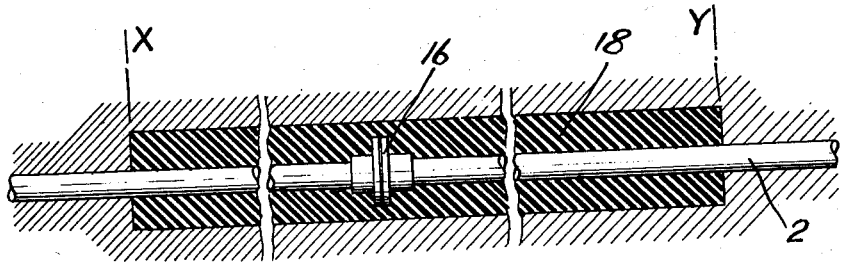

A preferred method of carrying out the invention will be apparent from the following description read in conjunction with the accompanying drawing, in which:

Fig. 1 is a diagram showing certain electrical connections to a buried conductor, the insulation of a portion of which is contemplated; and Fig. 2 is a sectional view showing the conventional type of insulated joint which would be placed in the line if the results of the experiments indicated that it was warranted.

There will be first discussed an analysis of the arrangement which is used for making the measurements in accordance with the present invention.

Considering first Fig. 1, there is indicated as an example of a conductor, a pipe line 2 which deductions from previous observations indicated should be insulated between X and Y. To be effective, the insulated section must be of substantial length. A short break may have only a negligible effect on configurations of the dimensions involved in electrolysis problems and may cause heavy current concentrations at the break in the two ends of the conductor. Consequently the distance between X and Y would probably necessarily be of the order of two hundred to four hundred feet in the case of a six inch pipe. If the deductions were correct, these spacings would generally be sufficient to quite considerably alter the electrical configuration involved and produce a satisfactory low concentration of current between the conductor and ground.

In general the breaks which are to be made are most useful when located at points where the currents flowing through the pipe attain maxima. This means that substantially no current is leaving or entering the walls of the pipe between X and Y and consequently the current entering one end of that section will be substantially equal to the current leaving the other end. However, even though the losses or gains of current are very large through the portions of the conductor considered, such losses are quite negligible compared with the currents in the pipe. For example, with a pipe current of ten amperes, probably the maximum loss or gain of current per foot would be about one milliampere, so that the total loss of current in, say, four hundred feet, would be only four-tenths of an ampere. Under the worst conditions, therefore, the percentage difference in the pipe currents at X and Y would be relatively small, substantially always smaller than that just indicated as the probable maximum which would occur where the losses were greatest. Of course in the usual places where breaks are to be made where the pipe current is maximum, the losses in four hundred feet are entirely negligible. This is mentioned since in the following discussion it will be assumed that the pipe current entering at X is equal to the pipe current leaving at Y. If conditions, as a matter of fact, are such that this is not the case within permissible limits of error, due account may be readily taken thereof.

In accordance with the present invention, current is fed into the portion of the conductor between X and Y through electrodes 4 and 6 connected to a source B, such as a battery, capable of delivering a heavy current I, the value of which may be checked by means of an ammeter. The currents so introduced are desirably of the order of one hundred amperes or more, since this current, practically short-circuited through the section XY, is depended upon to produce readable results on instruments elsewhere in the configuration.

Electrodes 10 and 12 are spaced outside the electrodes 4 and 6 at least five to ten times the maximum cross dimension of the conductor therefrom, in order that at 10 and 12 the flow lines are substantially lengthwise of the conductor, that is, the current distributions over cross-sections at 10 and 12 are uniform. Spaced from these by known distances are further electrodes 8 and 14. Between the electrodes 8, 10, 12 and 14 are located voltmeters $E_B$, $E_A$ and $E'_B$. The electrodes 8 and 10 and 12 and 14 are desirably located along portions of the pipe which do not include joints, the spacings of the members of each pair being noted. The drop across each such portion of the pipe, since the resistance of the length of pipe between the electrodes is known, will directly indicate the pipe currents which are flowing. If unknown conditions arise, due, for example, to an intervening joint, the pipe current may be measured as indicated in my application Ser. No. 9906, filed March 7, 1935. It is sufficient for present purposes to state that the voltmeters $E_B$ and $E'_B$ give a measure of the currents flowing through the portions of the conductor which they shunt. So far as the further discussion is concerned, it may be assumed that only one of these voltmeters is used, since the assumption will be made that the currents are the same in the corresponding portions of the conductor. As a matter of fact, the two are used merely to definitely indicate whether or not the assumption is justified.

At the right-hand end of Fig. 1 there are indicated diagrammatically instruments $E_P$ and $E_G$, designed to indicate respectively the current flowing through the pipe and the potential between the pipe and some portion of the surrounding earth. These instruments are merely illustrative. Actually in carrying out the experiment measurements should be made in various places dictated by what is known of the configuration to determine significant changes in current flow within the configuration which might be occasioned by breaking the conductor between X and Y. The measurements may be, for example, of the types indicated in my applications Ser. Nos. 9906 and 9907, filed March 7, 1935. So far as the present case is concerned, the method generally involves determining the conditions which will exist anywhere in the configuration if the conductor were broken. Substantially complete information may be secured with relatively few properly located instruments.

Assuming that the pipe current at some particular time is $i_o$ in the vicinity of XY, and, say, $i_{o1}$ in the vicinity of some instrument such as $E_G$ when the battery B is out of the circuit, and assuming that with the battery B in the circuit the current immediately outside XY is $i_o - i$, and at $E_G$, $i_{o1} - i_1$, the component $i$ of the pipe current may be considered as due to the battery, the current delivered by which is expressed as I. The currents may then be represented as indicated in Fig. 1. $i_o$ may be considered, as will be pointed out later, either as the sum of separate currents attributable to various sources, or a current attributable to a single source. It is immaterial what its composition is from the standpoint of the network being considered and in the following discussion $i_o$ may be regarded, for simplicity, as representing a current attributable to a single source.

Let us consider $E_G$ as representative of any meter which might be used somewhere in the configuration externally to XY, not necessarily connected to or adjacent the conductor. $E_G$ may then be expressed in terms of the voltage $E_A$ across XY, and various voltages corresponding in number to the various sources which produce appreciable effects in the system. However, $E_G$ may be just as completely expressed by an equal number of independent variables related to those just mentioned, for example, currents which may be ascribed to these voltages and which are found to be functions thereof, and hence we can write with complete generality:

$$E_G = F_t(i, i'_o, i''_o \ldots)$$

in which $i$ is the current at X and Y corresponding to the source external to the configuration, that is, to the battery B, and $i'_o$, $i''_o$, etc., are currents at X and Y corresponding in number to the various independent sources in the configuration and which may, though they do not necessarily, correspond individually to the sources to the extent they may be said to be due to them.

The function is written with the subscript "$t$" to call attention to variation with time, not of the currents, but of the configuration itself, i. e. the form of the function. The significance of this will be clear hereafter.

We may write, since, in general, the system is linear so that the increments are involved only in the first degree:

$$\Delta E_G = \frac{\partial E_G}{\partial i}\Delta i + \frac{\partial E_G}{\partial i'_o}\Delta i'_o + \frac{\partial E_G}{\partial i''_o}\Delta i''_o + \ldots$$

For simplicity, we will now consider only one current $i_o$ attributable to a source in the configuration. It will be obvious that the discussion will be similar for more than one though, of course, more complicated.

Then:

$$\Delta E_G = \frac{\partial E_G}{\partial i}\Delta i + \frac{\partial E_G}{\partial i_o}\Delta i_o$$

The partial differential coefficients are in general independent of $i$, $i'_o$, $i''_o$, ..., but usually vary with time as mentioned above. Such variation may be due, for example, to movement of an electric train along a track. Obviously, however, such changes with time in configuration are relatively slight. This can be realized by consideration of the very small part of the total circuit resistance for a traction current that is represented by the network including the earth, rails, and buried conductors. In other words, from the standpoint of this network, its own configuration is inappreciably altered by the addition and removal of relatively high resistance shunt paths represented by car motors, feed lines, and generators. Thus, while the currents flowing into and from the network are supplied through these comparatively high resistance external circuits, the effect of these circuits on the internal constants of the network is negligible for engineering purposes. This is another way of saying that, from the standpoint of the measurements under consideration, we can consider the network as essentially constant, but containing E. M. F.'s in various branches whose values vary with time. These considerations are of a practical nature and, while representing a mathematical approximation are borne out by comparisons of network constants made with and without load on the system from which the currents originate.

Assuming, therefore, that we are concerned with only a short time of observation during which the configuration remains the same from the practical standpoint, assume there are made two observations, one with the battery B out of the circuit and one with it inserted. The observations are also to be made with $i_o$ constant as may be ascertained by noting whether $E_B$ reads the same when the battery is cut out before and after its insertion. Naturally a series of pairs of observations are necessary so as to note and eliminate any results obtained during a momentary change of $i_o$.

Suppose with B out, $E_G$ reads $E_{Go}$ and with B in, $E_G$ reads $E_{Go} + \Delta E_G$. Then, since from the change of $E_B$ we can determine $\Delta i$, we know $$\frac{\Delta E_G}{\Delta i}$$

and so its equal $$\frac{\partial E_G}{\partial i}$$

since $$\Delta i_o = 0$$

under conditions of the experiment.

For the particular value of $i_o$ corresponding to these observations, we can now calculate the value of $E_G$ which would result when $i = i_o$, namely:

$$E'_G = E_{Go} + \frac{\partial E_G}{\partial i} i_o$$

As was pointed out, $E_G$ was merely representative of any voltage or current in the system. It is obvious that the argument just made would apply equally well to any other voltage or current, for any of which some value may be found in similar fashion corresponding to $i = i_o$. A particularly valuable determination is that of $E'_A$, the value of $E_A$ when $i = i_o$.

The argument may be obviously extended to determine similar values such as $E'_G$ or $E'_A$ if several independent sources are involved giving rise to a plurality of currents at X and Y, the values corresponding, then, to $i = i'_o + i''_o \ldots$ In other words, by the above method we can get for a particular configuration and for particular conditions of sources, values of voltages or currents in the system corresponding to no current flow across X and Y.

$$\frac{\partial E_G}{\partial i_o}$$

is usually not a constant since $i_o$, if only a single one representative of a group is considered, has many components not associated with earth to pipe interchanges at any one point. The experiment, however, measures $$\frac{\Delta E_G}{\Delta i}$$

accurately as brought out above. In view of the substantial electrical constancy of the network, the value of this quantity will vary little (generally less than 1%) for changes of conditions external to the network. Recording charts may be used to give $E_G$ as a function of time and also $i_o$ as a function of time from which $E'_G$ may be determined as a function of time from the relationships previously considered. This procedure eliminates the quantitative consideration of any one of the partial differential coefficients by using their summed effects. Though $E_G$ will represent potential differences not only related to the currents at XY but also to potential differences not related to currents at XY, $\Delta E_G$ referred to above will be related only to $i_o$ determined by the recorders.

As pointed out above, the electrical network associated with an insulating joint is usually quite local and the resistances of its members are unaffected to any measurable extent by variations in the total network, i. e., for example, net members extending through a car motor and generator. The electrolytic networks are of very low resistances and behave electrically like fixed passive networks to which various currents are applied at different times and places. Since these currents are supplied through circuits having many times the resistances in the network under consideration, the constants of the latter are not appreciably altered.

It is, therefore, unnecessary to resolve measurements to terms of separate internal E. M. F.'s since their effects are linear and algebraically additive and from the standpoint of one location can legitimately be lumped as one E. M. F. acting through one internal resistance, but having a more complicated dependence on time than any one component. This dependence can be measured with recorders and is sufficient for a complete solution of the problem.

From the above it will be obvious that observations extending over periods of time will correlate the changes with time and spatial variations in sources, for example, varying loads on power stations or movements of trains along tracks. Graphical records give these correlations quite readily. The most valuable correlations are between $E_G$ and $i_o$, to determine if the $\Delta E_G$ is proper for the purpose at all times, or to determine if it attains dangerous values in combination with $E_G$ at other locations.

What has been discussed already may be extended quite easily to determination of variations of values of voltages or currents in the system corresponding to simultaneous absence of current flow across X and Y and other pairs of boundaries in the same conductor as, or other conductors than, that involving the boundaries X and Y. The mathematical separation of variables in the fashion indicated above will for any specific case show the necessary observations and how they must be handled to secure, say, graphs showing results which would occur under conditions of no current flow at one or more localities.

From the general theory of electrical networks, it will be clear that the conditions attained external to XY if no current is flowing into or out of XY will be identical with the conditions external to XY if XY were entirely removed or, in other words, insulated. The only possible difference would be that due to leakage between X and Y in the experimental layout above discussed, which leakage would not be present if XY were insulated. Quantitatively, however, the leakage is negligible and hence the results attained above will validly indicate what would occur if the insulation were provided. The equivalence may readily be deduced from the simple consideration that the configuration external to XY cannot know what conditions exist between X and Y and can only know the conditions existing at X and Y, which conditions are completely determined by the currents flowing at those boundaries.

The value of $E_A$ under no current flow conditions at X and Y has already been noted as particularly useful. This value $E'_A$ represents the voltage across the insulating section and gives an indication of the conditions of the conductor at the ends of the insulated section, which conditions are sometimes made rather bad by insulation, since it may be found that there is a considerable difference of potential which might result in substantial electrolysis.

In actually carrying out the method it is generally unnecessary to secure as complete a story as might be indicated above. What is desired is a knowledge of the worst conditions which will exist due to the insulation. It may be found, for example, that electrolysis might occur through short periods of, say, peak loads of a power station or close approach of an electric railway car or the like. Whether or not the insulation should be made is then a question of practical consideration.

What is to be understood from the above is that the method may be used to give partial rather than complete results. In carrying out the work in a complete fashion automatic recording instruments may be used throughout the system, for example, at $E_B$, $E'_B$, $E_A$, $E_G$, etc. For precise work, simultaneous visual readings may be made to supplement recorded observations at times when the recorder indicates an especially critical or otherwise interesting condition. The source B may consist, for example, of a welding generator capable of supplying heavy currents provided with a commutator or other means for periodically reversing or interrupting the introduced current. Reversal is a desirable procedure. In such case, of course, the pipe current $i_0$ would have to be calculated from the mean of the readings given by $E_B$. The reversals are desirably made quite frequently so as to indicate whether the external conditions have or have not remained constant through the making of what may be regarded as a single reading. It may be noted that it is not necessary to use the generator throughout the making of recording meter readings since potential differences corresponding to recorded data may be calculated.

In view of the complicated nature of a practical arrangement and the discontinuities involved, it will be obvious that instead of an algebraical analysis graphical methods of analysis of the results are indicated. Graphs are particularly advantageous in indicating quite clearly correlations of current changes, for example, with varying loads on power stations, electric train schedules, or the like.

Following a determination that insulation of a section XY is desirable, insulation may be accomplished in conventional fashion, as illustrated in Fig. 2, by providing in the conductor an insulated joint such as 16 and covering the portion of the conductor including the joint between X and Y with a pitch box such as 18.

It will be seen that the method which has been described is adapted to give complete information as to the effects to be derived from insulating one or more sections of conductors and that this information can be obtained without breaking the conductor, and, in fact, even without exposing a buried conductor, since the electrode connections thereto may be made in conventional fashion merely by driving metallic stakes into the earth into contact with the conductor.

What I claim and desire to protect by Letters Patent is:

1. The method of predetermining an electrical effect which would result in the earth from providing an extended insulating joint in an elongated conductor having contact with the earth, including locating a measuring instrument at a suitable position to indicate the electrical effect to be determined, producing a variable flow of current through the conductor between terminals located in contact with the conductor at approximately the points corresponding to the ends of the proposed joint, and obtaining for different currents flowing between the terminals simultaneous indications of said measuring instrument and indications of currents flowing in the conductor adjacent to but outside the portion thereof between the terminals.

2. The method of predetermining electrical effects which would result in the earth from providing an extended insulating joint in an elongated conductor having contact with the earth and subject to varying electrical conditions due to a variable source, including locating a measuring instrument at a suitable position to indicate the electrical effects to be determined, producing a variable flow of current through the conductor between terminals located in contact with the conductor at approximately the points corresponding to the ends of the proposed joint, obtaining for different currents flowing between the terminals simultaneous indications of said measuring instrument and indications of currents flowing in the conductor adjacent to but outside the portion thereof between the terminals while the source is substantially constant, and repeating such operations for different conditions of the source.

3. In combination with an elongated conductor having contact with the earth and in which it is proposed to provide an extended insulating joint, a measuring instrument located at a suitable position to indicate an electrical effect in the earth of inserting an insulating joint, a pair of terminals located in contact with the conductor at approximately the points corresponding to the ends of the proposed joint, means for producing a variable flow of current through the conductor between the terminals, and means for indicating the current flowing in the conductor adjacent to but outside the portion thereof between the terminals.

JOHN M. PEARSON.